(12) United States Patent
Kottke et al.

(10) Patent No.: US 7,419,177 B2
(45) Date of Patent: Sep. 2, 2008

(54) BALL MOUNT

(75) Inventors: Craig Kottke, Grafton, WI (US); Scott Kalous, Kenosha, WI (US); Steve Deng, Haizhu District (CN)

(73) Assignee: Master Lock Company LLC, Oak Creek, WI (US)

( * ) Notice: Subject to any disclaimer, the term of this patent is extended or adjusted under 35 U.S.C. 154(b) by 196 days.

(21) Appl. No.: 11/449,336

(22) Filed: Jun. 8, 2006

(65) Prior Publication Data

US 2006/0290103 A1 Dec. 28, 2006

Related U.S. Application Data

(60) Provisional application No. 60/688,655, filed on Jun. 8, 2005.

(51) Int. Cl.
*B60D 1/06* (2006.01)

(52) U.S. Cl. .......................................... 280/511; 40/491

(58) Field of Classification Search ................ 280/507, 280/506, 511, 491.2; D12/162; 40/575, 40/591; 362/459
See application file for complete search history.

(56) References Cited

U.S. PATENT DOCUMENTS

| 6,079,136 | A  | * | 6/2000 | Kozlarek ..................... 40/541 |
| 6,253,476 | B1 |   | 7/2001 | Powell |
| 6,581,953 | B2 | * | 6/2003 | Jerry ........................... 280/486 |
| 6,910,705 | B1 | * | 6/2005 | Harwood et al. ............ 280/507 |
| D518,421  | S  | * | 4/2006 | Blankenship, Jr. ......... D12/162 |
| D530,652  | S  | * | 10/2006 | Tambornino ............... D12/162 |
| 7,222,510 | B2 | * | 5/2007 | Andersen ..................... 72/255 |
| 2004/0007852 | A1 | * | 1/2004 | Tambornino ............. 280/491.2 |
| 2006/0208456 | A1 | * | 9/2006 | Weaver .................... 280/491.5 |
| 2006/0284399 | A1 | * | 12/2006 | Scott et al. ................. 280/511 |

* cited by examiner

*Primary Examiner*—Anne Marie M. Boehler
(74) *Attorney, Agent, or Firm*—Calfee, Halter & Griswold LLP

(57) ABSTRACT

A customizable towing hitch ball mount arrangement for a vehicle is provided. The arrangement includes a ball mount and a customizing element. The ball mount includes a proximal end for insertion into an opening in the hitch receiver, an elongated tube portion, a drop portion extending from the elongated tube portion and angled with respect to a length of the elongated tube portion, and a plate extending substantially horizontally from the drop portion. The drop portion includes at least one mounting feature, and the plate includes a ball mount aperture for attachment of a hitch ball. The customizing element includes at least one mating feature disposed on a mounting surface of the customizing element. The customizing element is removably attachable to the ball mount by engaging the at least one mating feature of the customizing element with the at least one mounting feature of the ball mount.

9 Claims, 5 Drawing Sheets

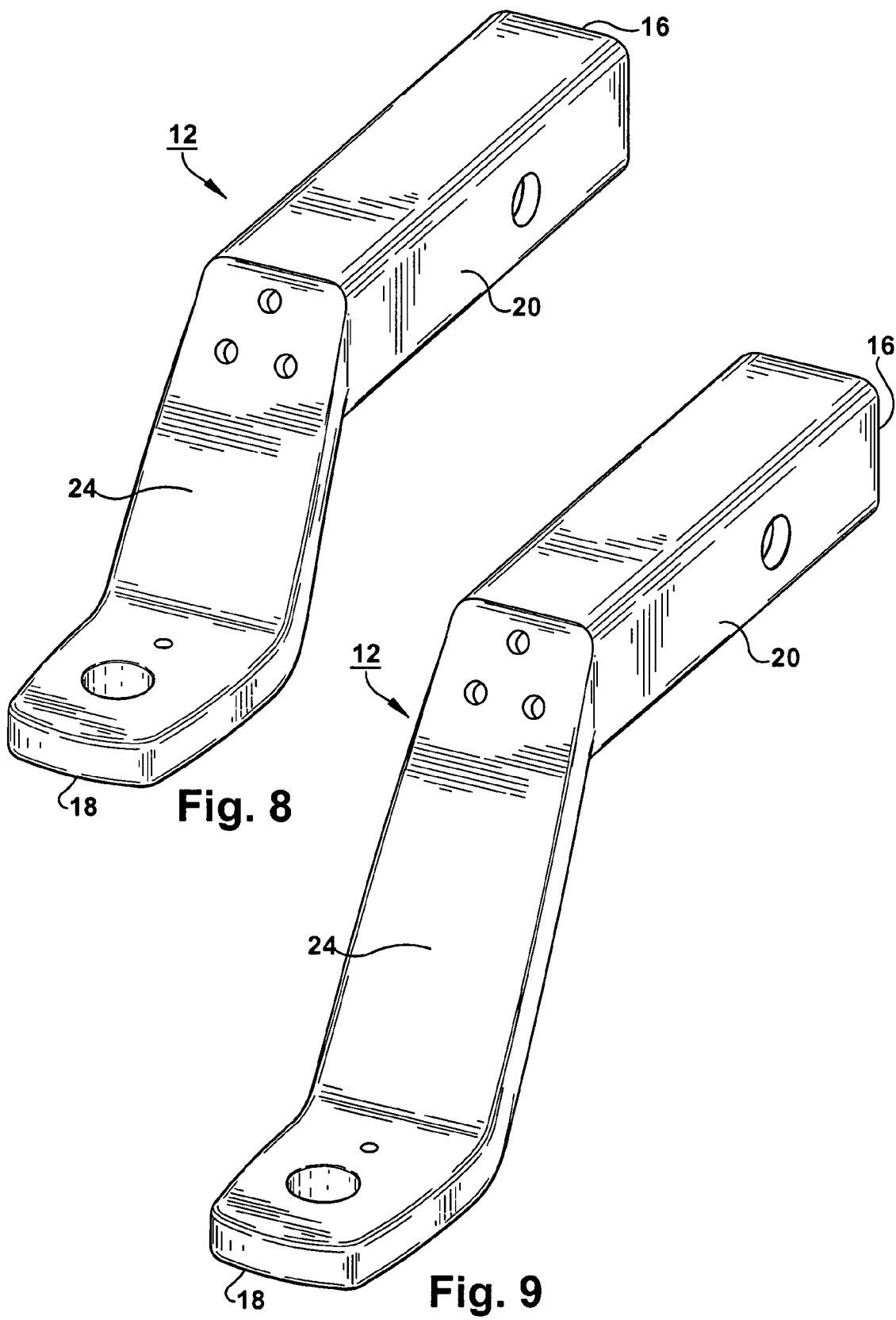

BALL MOUNT

CROSS REFERENCE TO RELATED APPLICATIONS

This application claims the benefit of U.S. Provisional Patent Application No. 60/688,655, filed Jun. 8, 2005, the entire disclosure of which is hereby incorporated by reference.

FIELD OF THE INVENTION

The present invention relates to hitch ball mounts for use in pulling trailers.

BACKGROUND OF THE INVENTION

The device used to attach a towing hitch ball to a vehicle is generally referred to in the art as a ball mount, as shown, for example, in FIGS. 1A, 1B, and 1C. These devices fit into a hitch receiver which is permanently mounted to the center rear of the vehicle. Ball mounts usually contain an elongated tube for insertion into the hitch receiver and a flat horizontal area for the hitch ball to sit. When not is use, ball mounts may be removed from the vehicle at the discretion of the vehicle operator.

Plugs which cover the opening in the hitch receiver when the ball mount is not installed are available with a wide range of cosmetic options like sports team logos, vehicle brand logos, etc., as shown, for example, in FIGS. 2A, 2B, and 2C. However, these popular plugs can only be used when the hitch ball is removed.

To satisfy a demand for ball mounts that include a cosmetic element, ball mounts with logos or other ornamentation have been developed. Ball mounts are typically made by an investment cast process, or similar process, which requires unique molds for each ball mount having a new cosmetic element. A new wax mold for investment casting needs to be made for every new logo or configuration with the existing design. Each new cosmetic design must be re-tested in case the cosmetic features cause a change in the manufacturing process that affect the strength. Each test must also be repeated for each available ball mount size (e.g., 2" drop, 4" drop, etc.). Certified testing is expensive and time consuming. Further, cast ball mounts typically have their surfaces polished or sand blasted after casting to give an acceptable surface finish. This process can be very time consuming due to the detail of the cosmetic elements and the polishing process can basically wipe away features making them less defined. Additionally, some cosmetic features/finishes cannot be produced by the casting process.

SUMMARY OF THE INVENTION

A customizable ball mount for a vehicle is provided. The ball mount includes an elongated tube portion, a drop portion extending from the elongated tube portion, and a plate extending from the drop portion. The elongated tube portion has a circumferential side wall, a proximal end for insertion into an opening in a hitch receiver on the vehicle, a pair of opposing apertures in the side wall for attaching the ball mount to the hitch receiver, and an access opening disposed in the side wall. The drop portion is angled with respect to a length of the elongated tube portion and has a planar area facing away from the proximal end with at least one mounting hole disposed on the planar area. The plate extends substantially horizontally from the drop portion, and includes an aperture for attachment of a hitch ball. The access opening is adapted to provide access to an inner surface of the drop portion opposite the planar area, to allow for attachment of a customizing element to the planar area.

Further features and advantages of the invention will become apparent from the following detailed description made with reference to the accompanying drawings.

BRIEF DESCRIPTION OF THE DRAWINGS

The present invention will be more fully understood by reference to the following detailed description of the invention and the accompanying drawings. The drawings represent exemplary embodiments of the present invention and are included for illustrative purposes in order to facilitate understanding of the description. Other embodiments of the present invention contemplated by the description are included within this application to the extent they fall within the scope of the claims attached hereto.

FIG. 8 is a perspective view of another ball mount; and

FIG. 9 is a perspective view of yet another ball mount.

DETAILED DESCRIPTION OF THE INVENTION

The Detailed Description of the Invention merely describes preferred embodiments of the invention and is not intended to limit the scope of the claims in any way. Indeed, the invention as described by the claims is broader than and unlimited by the preferred embodiments, and the terms in the claims have their full ordinary meaning.

The present invention provides a customizable towing hitch ball mount for assembly with a hitch receiver on a vehicle. The invention provides a ball mount that is adapted to have any one or more of a variety of customizing elements removably attached to the ball mount, thereby separating the cosmetic or auxiliary features of the ball mount from the towing aspect. This separation can reduce costs of certified testing of investment cast ball mounts, simplify surface polishing and sand blasting operations on the ball mount, and allow for more versatile customization of the ball mount, which may otherwise be limited by the investment casting process. The various embodiments of the invention offer other specific improvements over prior art cast ball mounts.

The embodiments of the present ball mount offers increased flexibility and reduced manufacturing costs by including several novel design features. In one embodiment, the ball mount may include a separate mounting area for a cosmetic element. Therefore, the cosmetic element can be switched at the discretion of the vehicle operator. Further, the cosmetic element can be made by alternative manufacturing processes, in lower quantities, and in shorter lead times than available by investment casting. One cosmetic element can be used on a variety of configurations, such as for example, 2", 4" and 6" drop configurations.

The device may provide options for attaching cosmetic or other elements to a towing ball mount. The device may improve operator options, device appearance, and manufacturability over known devices by making the cosmetic elements separable from the functional aspects of the ball mount.

Figure 3:
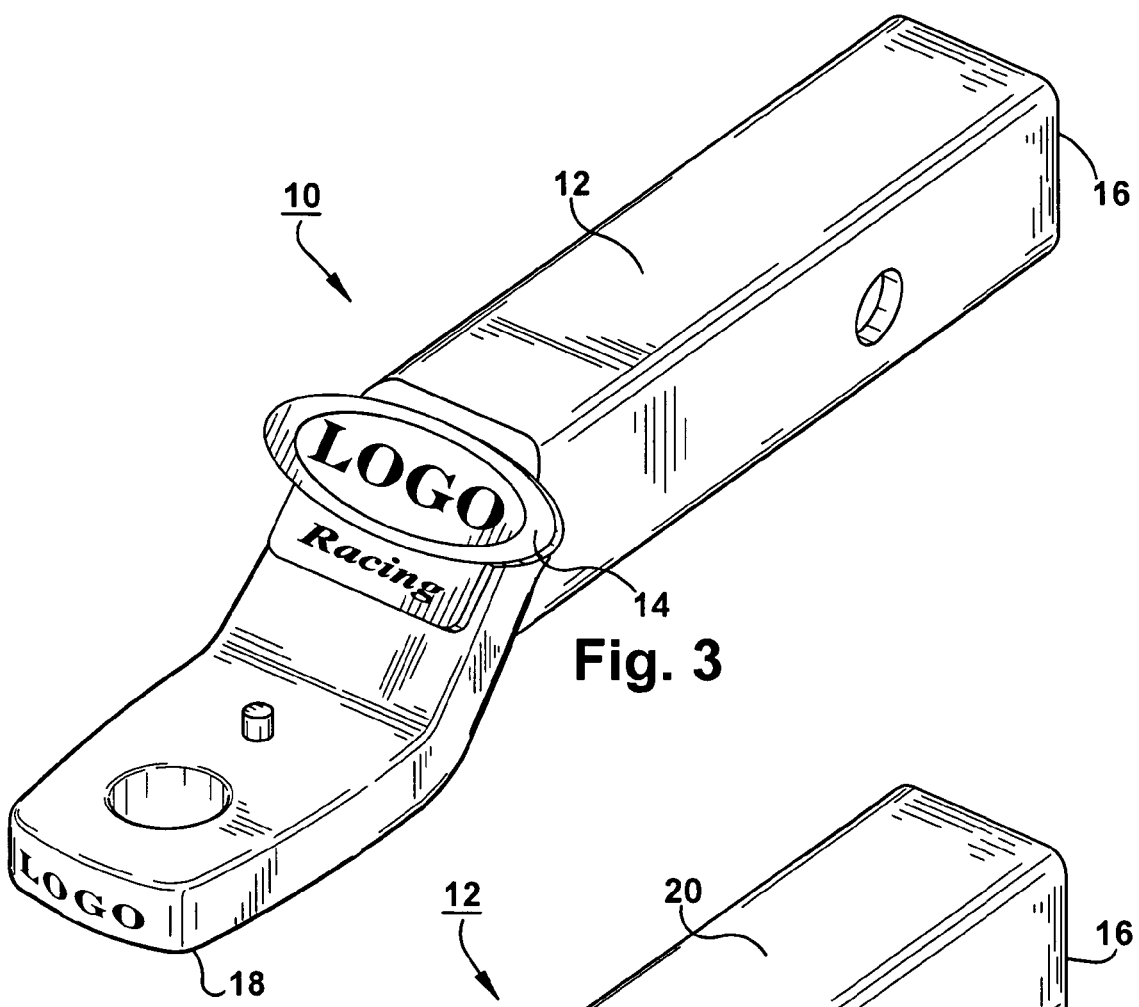
FIG. 3 is a perspective views of a trailer hitch ball mount device.

In an embodiment of the present invention shown in FIG. 3, a ball mount device 10 includes a ball mount 12 and a customizing element 14. While the customizing element 14 may include an ornamental logo or display, as shown in FIG. 3, the customizing element may provide other useful features, such as, for example, light sources, visual indicators, or covering, locking, or attachment means, as discussed more fully below. The device 10 is installable into the hitch receiver (not shown) of a conventional vehicle, such as for example, a pickup truck or an SUV. When not in use for pulling a trailer or other object, the device 10, with or without the customizing element 14, can remain installed and provide cosmetic appeal or functional utility.

Figure 4:
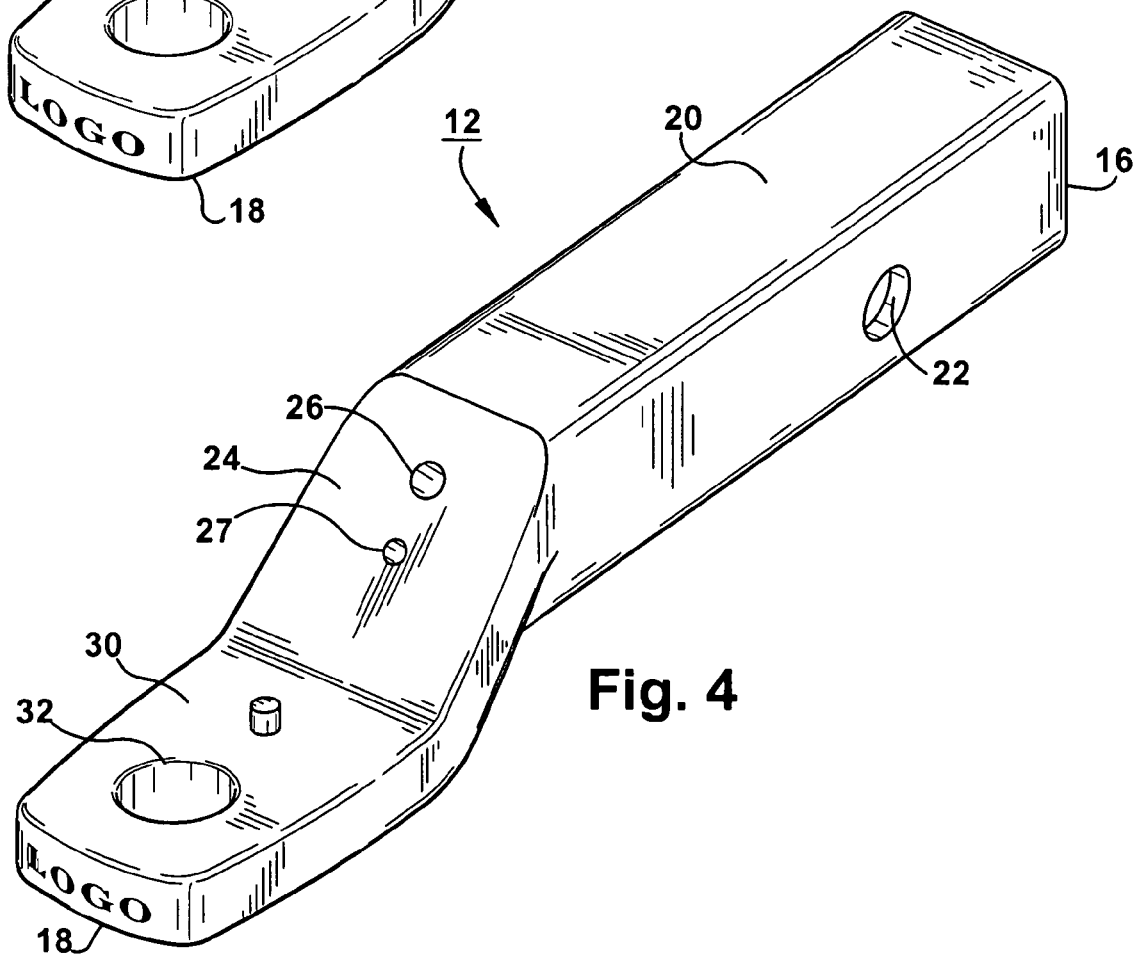
FIG. 4 is a perspective view of a ball mount of the device of FIG. 3.

Referring now to FIG. 4, a perspective view of the ball mount 12 is shown. The ball mount 12 includes a proximal end 16 in relation to a vehicle (not shown) and a distal end 18. The proximal end 16 is inserted into a hitch receiver of a vehicle. An elongated tube section 20 of the ball mount defines two opposing apertures 22. By using these apertures 22, a pin or locking device is used to mount or attach the ball mount 12 to the hitch receiver.

Figure 1A:
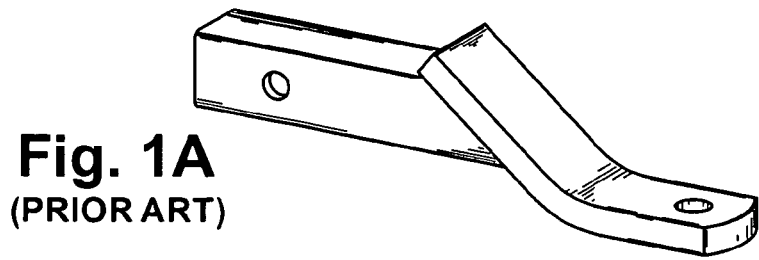
FIGS. 1A, 1B, and 1C are perspective views of various conventional ball mounts.
Figure 1B:
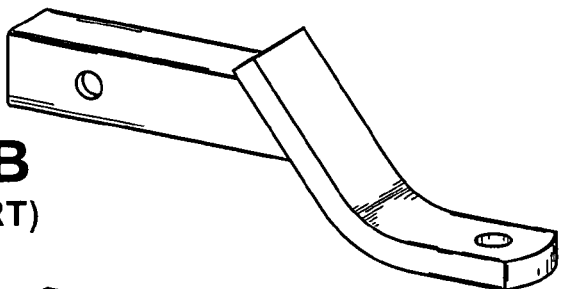
Figure 1C:
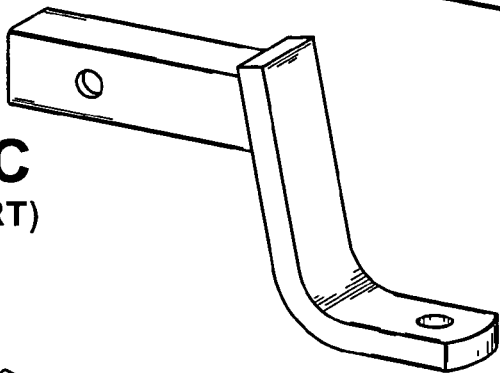

For example only, FIGS. 1A, 1B, and 1C are perspective views of various conventional ball mounts. The ball mount 12 of the present invention can be manufactured by investment ball casting as shown, or by any other suitable method such as a common welded design used with a mounting feature drilled or machined into the angled plate that is welded onto the tube.

To allow for the attachment of a customizing element 14 to the ball mount 12, one or more mounting features may be provided on the ball mount. In the embodiments of FIGS. 3-9, the ball mount 12 further includes an angled planar area 24. This area is commonly referred to in the art as a drop 24. As shown, the drop 24 defines one or more mounting features or mounting apertures 26, 27. It should be understood by those with ordinary skill in the art that other aperture combinations, involving various positions and quantities of apertures, can be used in the practice of the present invention, and that the positions of these mounting features is not limited to the drop 24. Further, any manner of mounting features may be provided on any part of the ball mount, including, for example, hooks, posts, clips, and magnetized surfaces. The ball mount also includes a flat horizontal area or plate 30 that defines an aperture 32 for insertion of a hitch ball (not shown).

The ball mount 12 of FIG. 3-7 has a drop/rise configuration of approximately 2 inches, as measured vertically from the upper surface of the elongated tube 12 to the upper surface of the plate 30. However, it should be understood by those with ordinary skill in the art that the present invention is applicable to a variety of configurations. For example, FIGS. 8 and 9 show devices of the present invention with different drop/rise configurations, such as 4 inches (FIG. 8) and 6 inches (FIG. 9). Regardless of the dimension of the drop 24, the drop 24 may provide an at least partially vertical surface, such as, for example, the angled planar surface shown in FIGS. 3-5, from which a customizing element 14 may be displayed.

Figure 5:
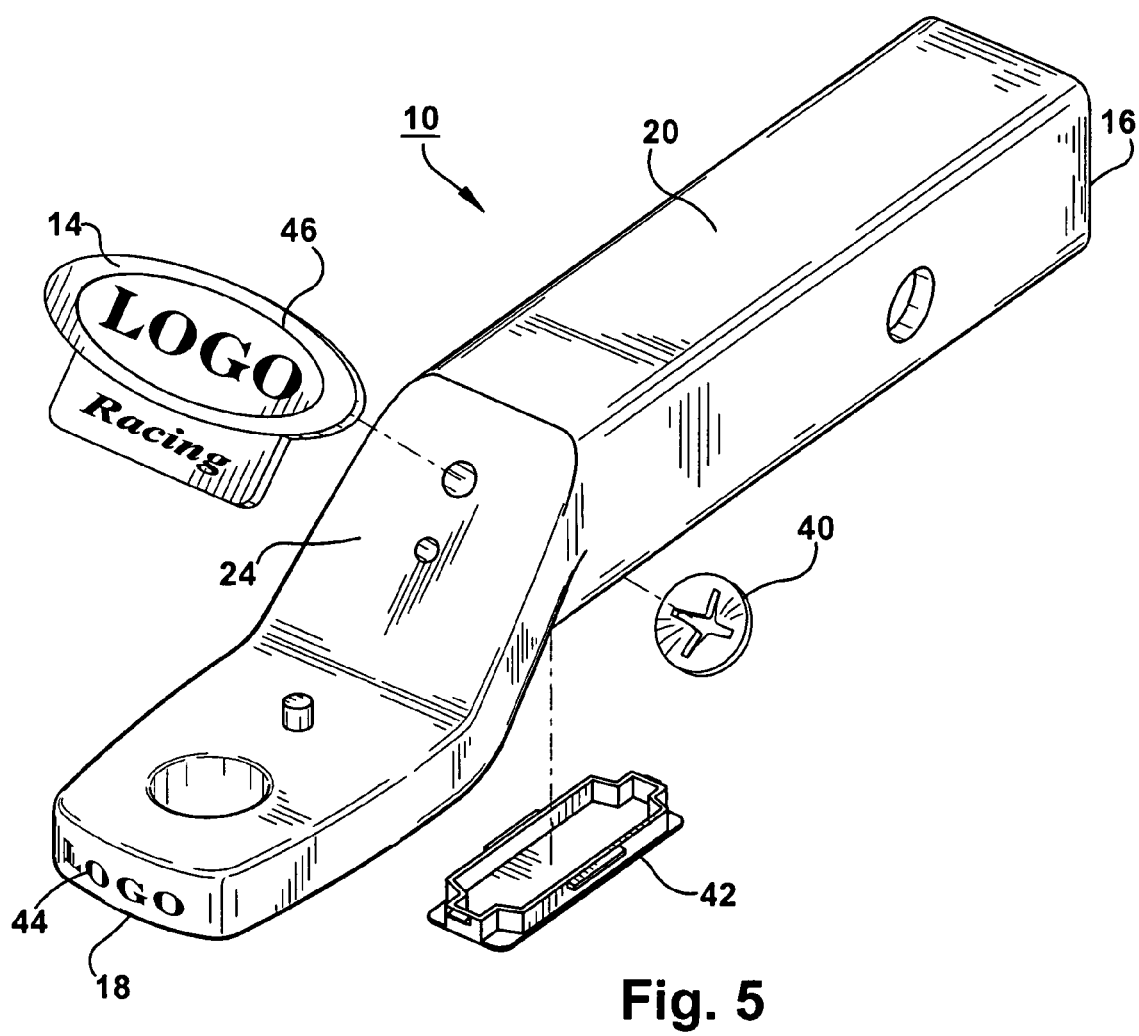
FIG. 5 is an exploded perspective view of a trailer hitch ball mount device, showing a ball mount, mounting hardware, a customizing element, and a cap.

An assembly view of the exemplary embodiment of the device 10 is shown in FIG. 5. The device includes the ball mount 12, the customizing element 14, mounting hardware 40 and a cap 42. As shown, the ball mount 12 may include an additional visual identifier or cosmetic element 44 at the distal end 18.

Figure 2A:
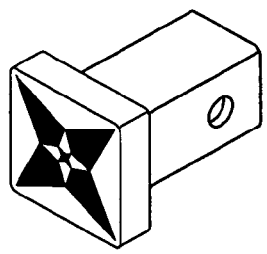
FIGS. 2A, 2B, and 2C are perspective views of various conventional trailer hitch plugs.
Figure 2B:
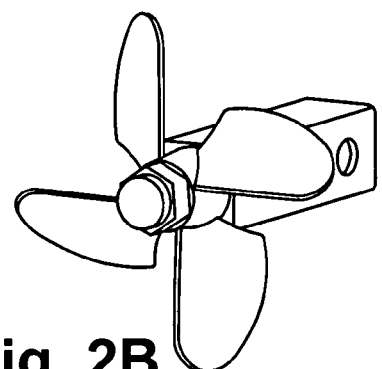
Figure 2C:
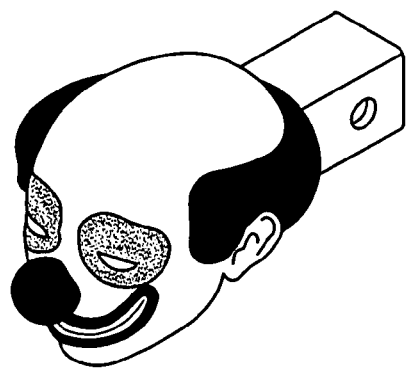

In the exemplary embodiment, the customizing element 14 is mounted to the drop area 24 of the ball mount 12. The customizing element 14 may include a logo or indicia 46 associated with a recognizable commercial brand, sports team, trademark etc. A variety of other indicia can be used in the practice of the present invention. For example only, FIGS. 2A, 2B, and 2C include perspective views of various conventional trailer hitch plugs that include other cosmetic designs. However, it should be noted that the customizing element need not be limited to cosmetic properties, and in some embodiments, may provide functional utility instead of, or in addition to, cosmetic features. Other elements that could be installed to the ball mount 12 include, for example only: all or part of a trailer locking mechanism to secure the coupler on the hitch ball during use; a work light or back-up light, either connected to the vehicle power system or battery operated; a visual device to help with alignment to the trailer coupler while backing up the vehicle; a mechanical device to help with the alignment of the vehicle and trailer coupler; or a foot step, either folding or side location; a storage box for towing supplies or other items. As another example, the customizing element may include a hinged and/or removable flip-up hitch cover, which may cover the entire hitch ball and most of the exposed ball mount when not towing to reduce exposure to the elements. The cover could also be padded internally or externally to soften the blow when someone walks into the protruding ball mount. The exterior of the cover could have a location for cosmetic elements and eliminate the issue of the cosmetics being hard to see on the ball mount with the hitch ball in place. In alternative embodiments of the invention, multiple customizing elements may be attachable to the ball mount.

The customizing element 14 could be produced by a variety of methods, which may be either the same as (such as investment casting) or different than the methods used to produce the ball mount 12. This flexibility is one of the advantages of the separation of the towing and accessory elements. For example, the customizing element 14 may include parts made by aluminum or zinc die casting, plastic injection molding, stamping or forging.

Figure 6:
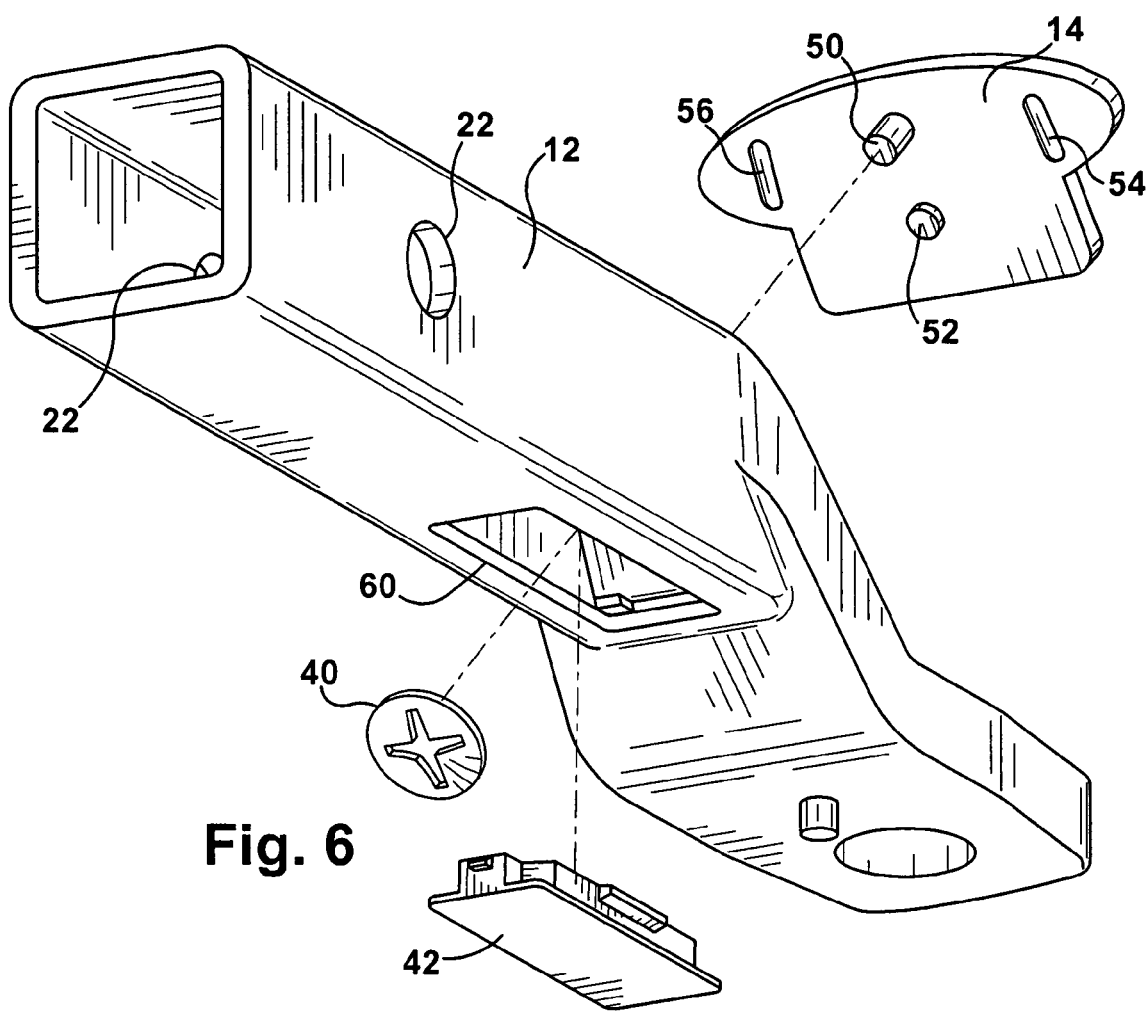
FIG. 6 is an opposite exploded perspective view of the device of FIG. 5.

In the exemplary embodiment, the customizing element 14 may be easily removable from the ball mount 12 by an operator, without removing the ball mount 12 from the vehicle. FIG. 6 is an opposite exploded perspective view of the assembly view shown in FIG. 5. The customizing element 14 may be provided with one or more mating features for engaging with the mounting features on the ball mount to attach the customizing element to the ball mount. In the exemplary embodiment, the customizing element 14 includes two mating features, which, in the illustrated example, are protruding knobs or protrusions 50, 52 that may be inserted into the apertures 26, 27 in the drop 24. The two protrusions prohibit rotation of the customizing element 14 on the drop 24. It should be understood by those with ordinary skill in the art that other types, quantities, and orientations of mating features can be used in the practice of the present invention. For example, the mating features may include one or more of any combination of mounting holes, hooks, clips, magnets, or other features adapted to engage the corresponding mounting features on the ball mount.

To affix the customizing element to the ball mount, a fastener or mounting hardware component may be attached to one or more of the mounting features and/or mating features. In an exemplary embodiment, as shown in FIGS. 5 and 6, after an operator has assembled the customizing element 14 onto the drop 24, a press-fit slotted washer 40 or other suitable mounting hardware may be pressed over the knob or protrusion 50 to affix the customizing element 14 to the ball mount 12. It should be understood by others with ordinary skill in the art that any suitable mounting technique and mounting hardware can be used in the practice of the present invention. As one example, the customizing element 14 may be mounted by magnetic means, wherein the ball mount is provided in a magnetized material, such as a steel alloy, and the customizing element 14 includes a magnet. One or more alignment features, such as, for example, elongated ribs 54, 56 shown in FIG. 6, may be provided on the mounting surface of the customizing element 14, such that the alignment features engage a corresponding surface on the ball mount, such as, for example, the edges of the drop, to position the customizing element 14 during installation, to prevent rotation of the customizing element 14, and/or to limit movement of the customizing element 14 during vibration.

The ball mount may be provided with an access opening or any suitable opening to facilitate attachment (or subsequent detachment) of a fastener or mounting hardware component to one or more of the mating features and/or mounting features during installation of the customizing element. As shown in FIG. 6, the exemplary ball mount 12 includes a rectangular-shaped opening 60 within the elongated tube portion 20. In the practice of the present invention, the opening can be any shape and its location can vary. The exemplary access opening 60 is positioned behind the ball mount of the drop 24 such that a rear surface of the drop 24, opposite the angled face, may be accessed by hand or by a tool, such as, for example, a screwdriver or wrench, for attachment of a fastener to the mating feature, such as protrusion 50.

As an additional benefit, the access opening may be used in a manufacturing process, such as investment casting, to remove excess casting materials by, for example, permitting insertion of a tool through the opening 60 to access internal surfaces of the elongated tube portion 20 and drop 24.

Figure 7:
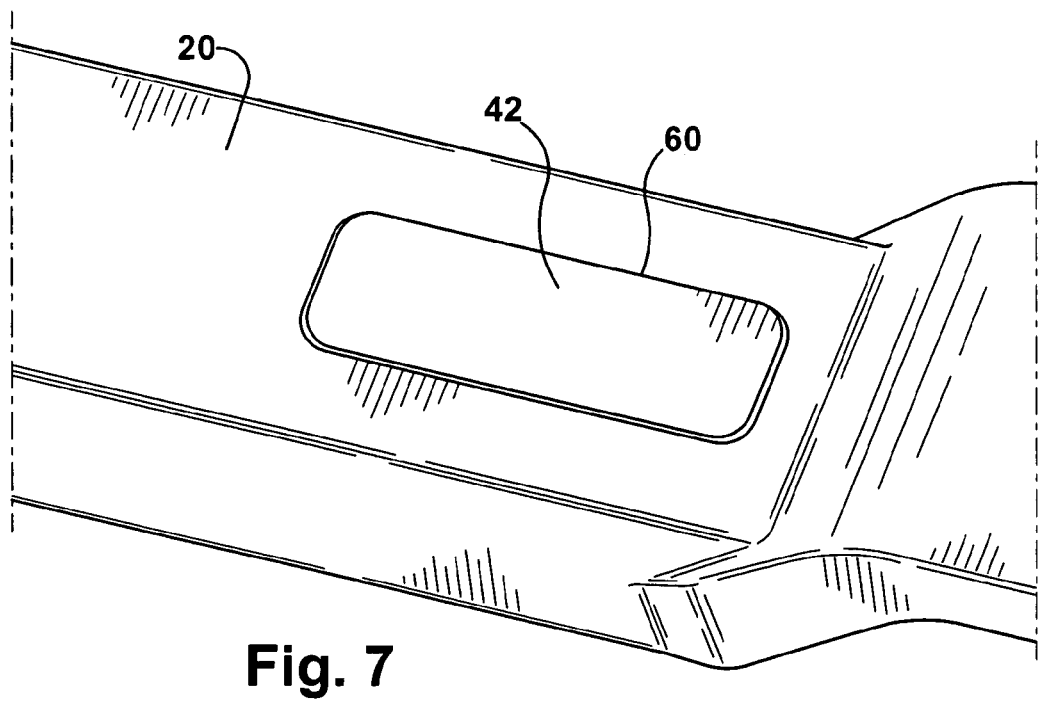
FIG. 7 is a partial bottom perspective view of the device of FIG. 5, showing a cap in an installed position.

When the access opening is not in use, a cover may be provided to keep out dirt or debris and/or provide cosmetic appeal. In the exemplary embodiment, as shown in FIGS. 6 and 7, a cap 42 may be press fit into the opening 60. The cap 42 may be made of soft molded plastic or any other suitable material. By removing the cap 42, the operator has access to the mounting hardware 40. FIG. 8 is a bottom perspective view of the device 10 showing the cap 42 in an installed position.

While several embodiments of the invention has been illustrated and described in considerable detail, the present invention is not to be considered limited to the precise constructions disclosed. Various adaptations, modifications and uses of the invention may occur to those skilled in the arts to which the invention relates. It is the intention to cover all such adaptations, modifications and uses falling within the scope or spirit of the claims filed herewith.

What is claimed is:

1. A customizable towing hitch ball mount arrangement for assembly with a hitch receiver on a vehicle, the arrangement comprising:

a ball mount having a proximal end for insertion into an opening in the hitch receiver; an elongated tube portion; a drop portion, extending from the elongated tube portion and angled with respect to a length of the elongated tube portion, the drop portion having at least one mounting feature; and a plate extending substantially horizontally from the drop portion, the plate having an aperture for attachment of a hitch ball;

a customizing element having at least one mating feature disposed on a mounting surface of the customizing element, wherein the customizing element is removably attachable to the ball mount by engaging the at least one mating feature of the customizing element with the at least one mounting feature of the ball mount; and wherein the at least one mounting feature comprises a mounting hole in an angled surface of the drop portion, and the at least one mating feature comprises a protrusion extending from the customizing element.

an access opening in the elongated tube portion, wherein the access opening is adapted to provide access to an inner surface of the drop portion, opposite the angled surface, for attachment of a fastener to the protrusion when the protrusion is inserted through the mounting hole.

2. The arrangement of claim 1, further comprising a removable cap for covering the access opening.

3. The arrangement of claim 1, wherein the customizing element further comprises at least one alignment feature, disposed on the mounting surface, wherein the at least one alignment feature is adapted to engage an edge of the drop portion for alignment of the customizing element with respect to the drop portion.

4. The arrangement of claim 1, wherein the at least one mounting feature comprises a magnetized surface, and the at least one mating feature comprises a magnet.

5. The arrangement of claim 1, wherein the customizing element comprises an ornamental logo.

6. The arrangement of claim 1, wherein the customizing element comprises a light source.

7. The arrangement of claim 1, wherein the customizing element comprises a locking mechanism.

8. The arrangement of claim 1, wherein the customizing element comprises a coupler alignment mechanism.

9. A method for manufacturing a customized towing hitch ball mount, the method comprising:

forming a ball mount having an elongated tube portion, a drop portion extending from the elongated tube portion, and a plate extending substantially horizontally from the drop portion;

providing a mounting feature on the drop portion, wherein providing a mounting feature on the drop portion comprises providing a hole in an angled surface of the drop portion, and engaging the mating feature with the mounting feature comprises inserting the mating feature through the hole;

providing a customizing element having a mating feature disposed on a mounting surface of the customizing element;

attaching the customizing element to the ball mount by engaging the mating feature of the customizing element with the mounting feature of the ball mount;

providing an access opening in the elongated tube portion, inserting a fastener through the access opening, and assembling the fastener with the inserted mating feature.

* * * * *